United States Patent [19]

Ferrell et al.

[11] 4,094,354

[45] June 13, 1978

[54] BREAKER REINFORCING TAPE FOR BELTED PNEUMATIC TIRES, AND TIRES MADE THEREFROM

[75] Inventors: Wesley Ferrell, Southbury; Daniel Shichman, Trumbull, both of Conn.

[73] Assignee: Uniroyal, Inc., New York, N.Y.

[21] Appl. No.: 775,803

[22] Filed: Mar. 9, 1977

[51] Int. Cl.² .............................................. B60C 9/22
[52] U.S. Cl. ........................... 152/361 R; 156/128 R; 156/179; 428/184; 428/186; 428/295; 428/297
[58] Field of Search ..... 152/361 R, 361 DM, 361 FP; 428/167, 184, 186, 295, 297; 156/96, 123, 128 R, 128 I, 166, 176, 178, 179, 183

[56] References Cited

U.S. PATENT DOCUMENTS

| | | | |
|---|---|---|---|
| 1,779,391 | 10/1930 | Darrow | 156/128 R |
| 2,884,044 | 4/1959 | Hulswit, Jr. et al. | 156/123 X |
| 2,982,328 | 5/1961 | Emanueli et al. | 152/361 R |
| 3,252,833 | 5/1966 | Skobel | 428/297 |
| 3,525,655 | 8/1970 | Wood et al. | 152/361 R X |
| 3,774,662 | 11/1973 | Neville et al. | 152/359 X |
| 3,900,062 | 8/1975 | Neville et al. | 152/361 R X |
| 3,956,546 | 5/1976 | Neville et al. | 428/184 X |
| 3,979,536 | 9/1976 | Neville et al. | 428/295 X |
| 4,050,973 | 9/1977 | Neville et al. | 156/128 R X |

FOREIGN PATENT DOCUMENTS

746,375   3/1956   United Kingdom ............ 156/96

*Primary Examiner*—Randolph A. Reese
*Attorney, Agent, or Firm*—Norbert P. Holler

[57] ABSTRACT

A breaker reinforcing tape for belted pneumatic tires, a method of making such tape, and a method of constructing such tires therewith, are disclosed. The tape includes a generally sinusoidally crimped strip of uncured rubber and a plurality of similarly crimped parallel cords having their undulations following and nesting in the undulations of the crimped strip, the cords at successive apexes being secured to successive apexes of the strip. A second uncured rubber strip in a flat condition is secured to alternate ones of the apexes of the undulations of the array of cords and the crimped strip at one face of the latter. At least one frangible element is interposed in a fixed and substantially flat condition between the crimped and flat strips for releasably reinforcing and stabilizing the flat strip against inadvertent expansion that would prematurely reduce the amplitude and frequency of the undulations of the crimped strip and its associated cords. The tape, when used in making a tire, is wound helically about the crown region of the carcass, outwardly of the breaker plies, at an angle of substantially zero degrees to the mid circumferential plane of the carcass. This abstract is not to be taken either as a complete exposition or as a limitation of the present invention, however, the full nature and extent of the invention being discernible only by reference to and from the entire disclosure.

55 Claims, 8 Drawing Figures

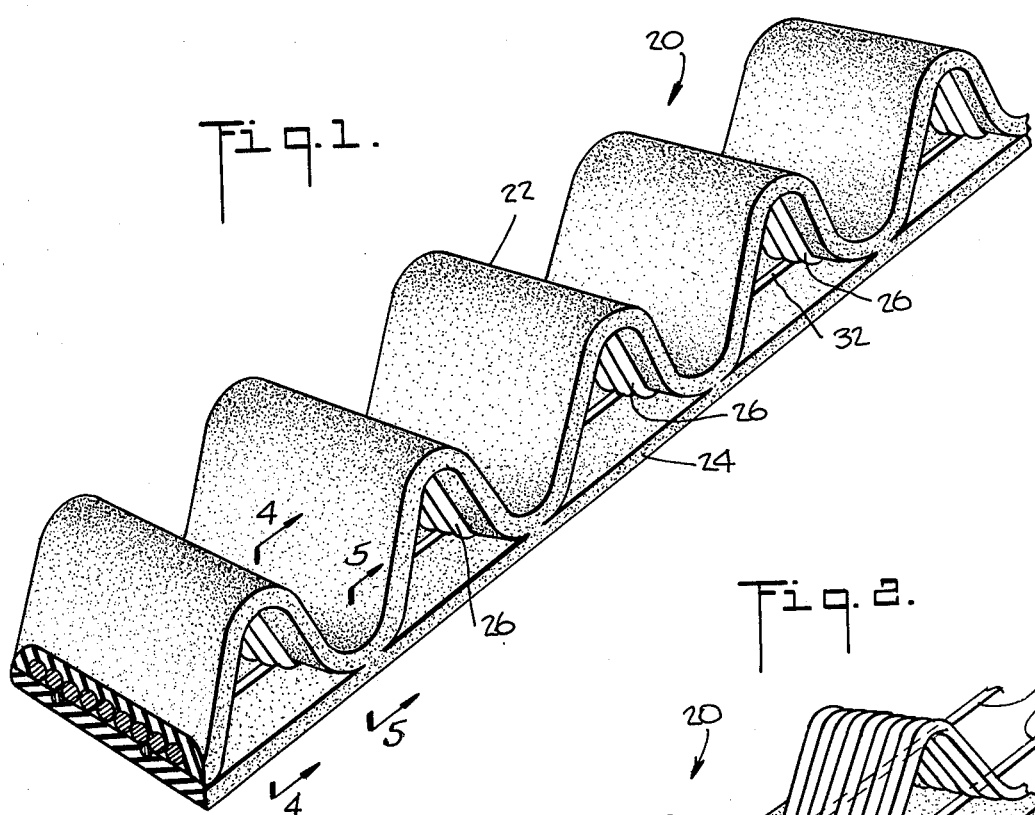
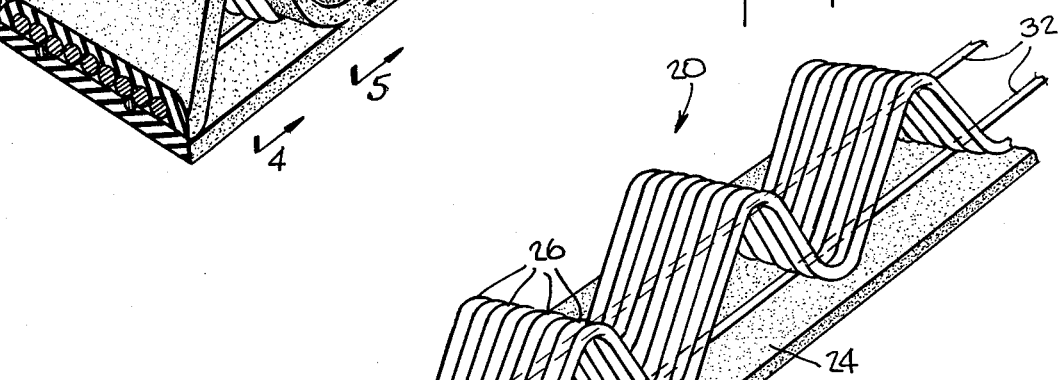
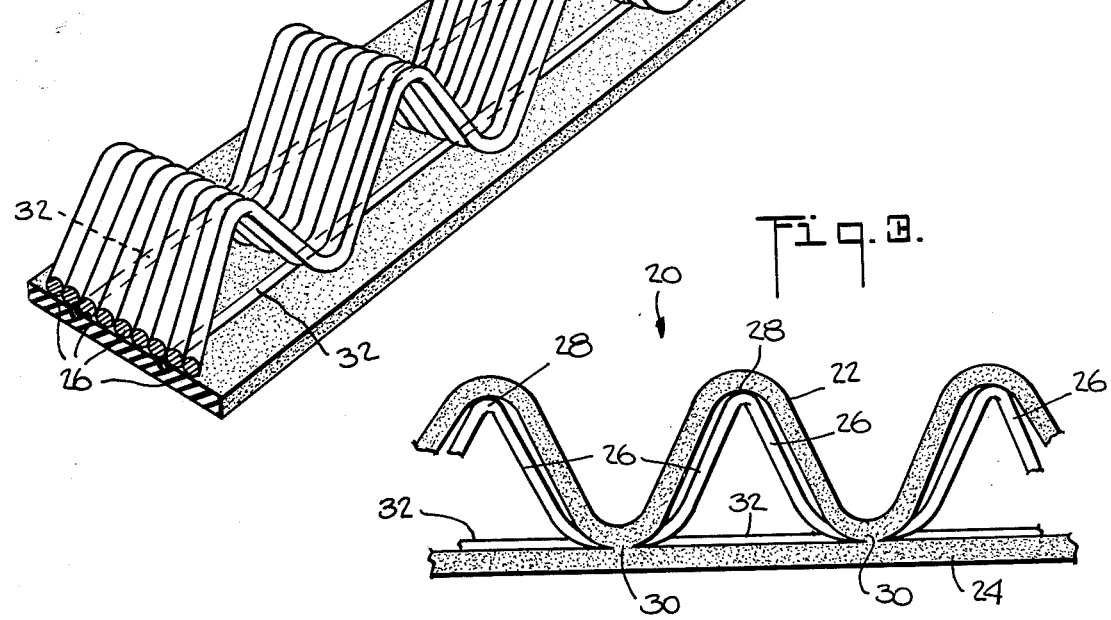

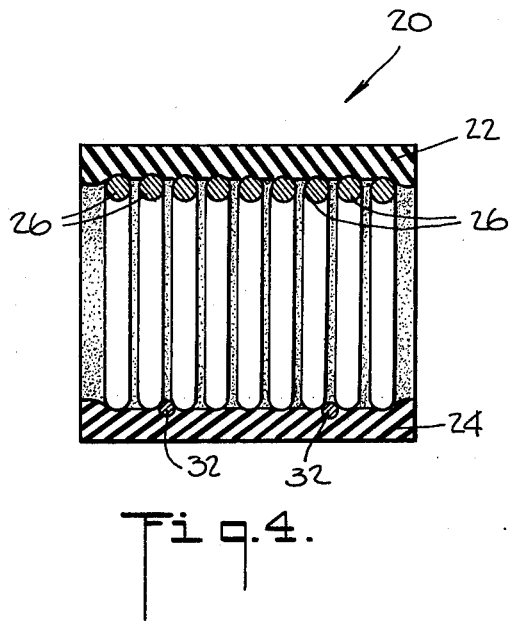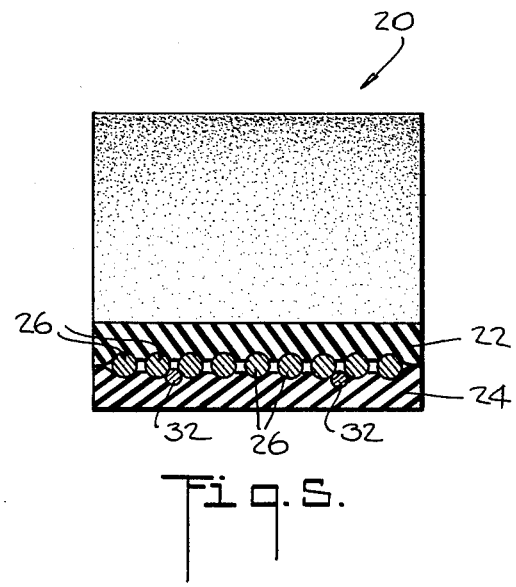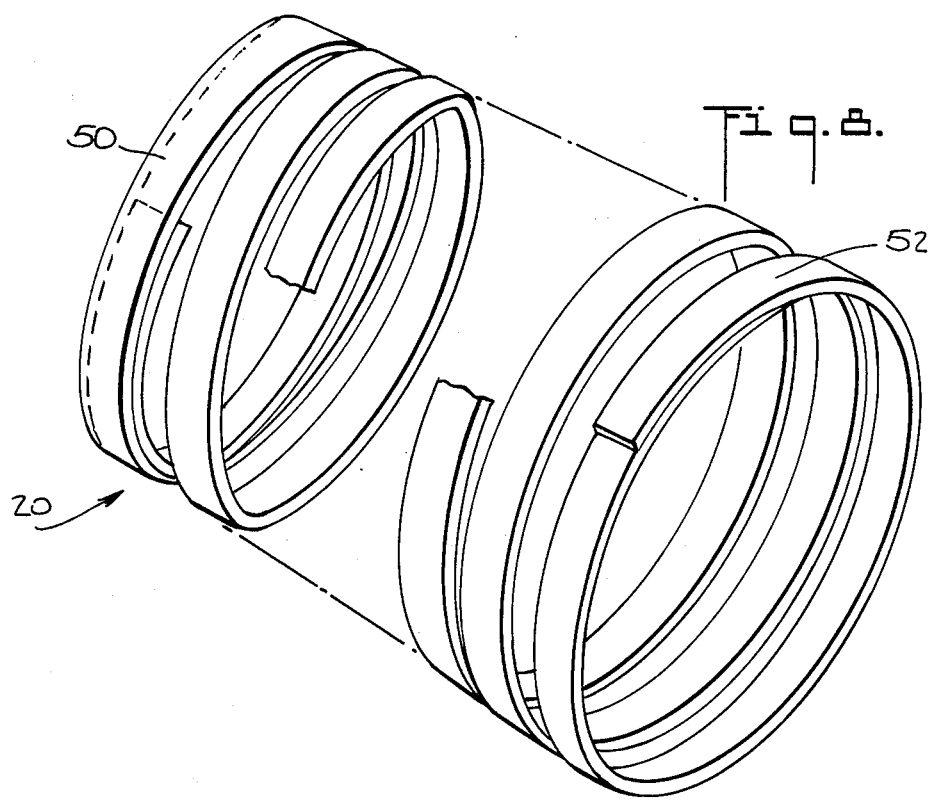

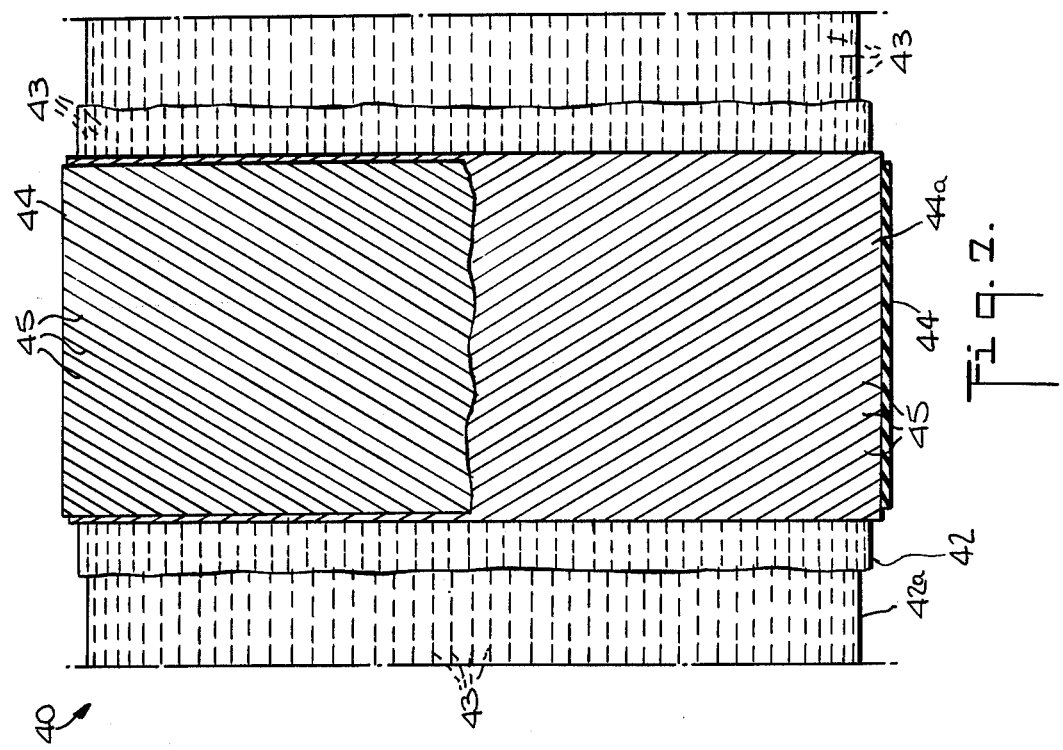
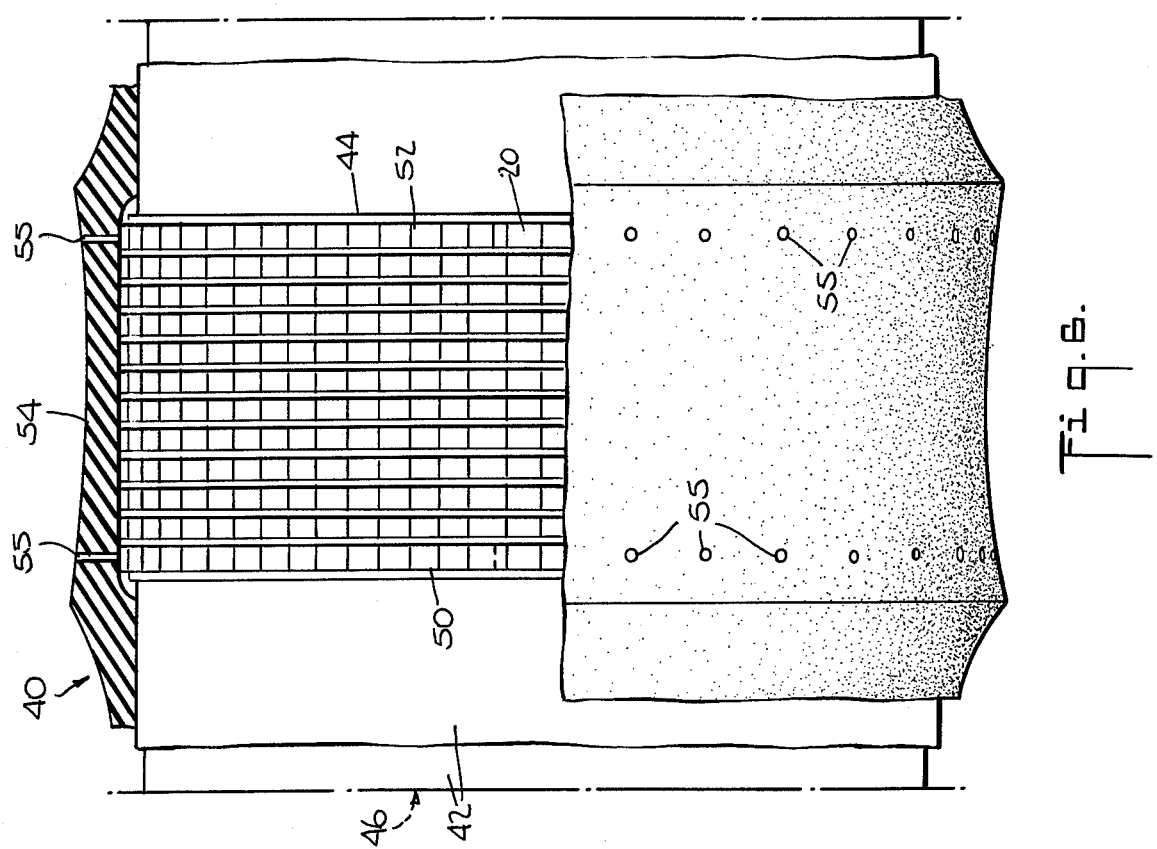

BREAKER REINFORCING TAPE FOR BELTED PNEUMATIC TIRES, AND TIRES MADE THEREFROM

BACKGROUND OF THE INVENTION

The present invention relates generally to pneumatic tire carcasses, and more particularly to a breaker-functioning tape for reinforcing a radial ply tire carcass capable of being constructed in a single stage; namely, in one stage, on a single drum, in which a breaker assembly and a tread are applied to the carcass plies before the unit is converted from a substantially cylindrical condition to a substantially toroidal condition.

Radial ply tire manufacturers in increasing numbers are now attempting to build radial ply tires in a single stage to eliminate the need for the additional "second stage" equipment and labor typically required for such tire construction. In this regard, conventional procedure for constructing radial ply tires includes a "first stage" in which the carcass or body plies are wound on a substantially cylindrical building drum. Thereafter, among other things, beads are applied and anchored to the opposite end portions of the cylindrically arranged body plies, and the entire unit (or "first stage carcass") is transformed into a cylindrical form. The cylindrical "first stage carcass" is then transferred to conventional "second stage" equipment at which the cylindrical form is shaped to a toroidal shape and where breaker plies and tread are applied to it for transformation into a "second stage carcass" ready for vulcanization. The additional equipment and labor necessary for effecting the "second stage" as an independent operation is excessively costly not only with respect to equipment and labor, but also with respect to time and space necessary for storing the additional equipment. Clearly, the conventional two stage radial ply tire constructing operations are not entirely desireable.

In order to eliminate the "second state", radial ply tire manufacturers have been applying the breaker plies and tread to the radial ply carcass or body plies in much the same way and on equipment much the same as for building conventional bias ply tires; namely, before the cylindrical carcass is transformed into a toroid. However, such manufacturers have encountered the difficulty of using breaker plies whose substantially inextensible cords form a high bias angle (in excess of 35°) with a median equatorial plane of the carcass, and thus readily pantograph to accommodate the substantial expansion of the carcass into a toroid. A high bias angle provides for a satisfactory lateral stiffness in the breaker plies, but at the cost of an unsatisfactory or insufficient amount of circumferential stiffness. An insufficient amount of circumferential stiffness will result in an unacceptably high rate of tread wear.

It has been proposed, for example, in conjunction with the disclosure in U.S. Pat. No. 3,900,062, issued on Aug. 19, 1975, the subject matter of which is hereby incorporated by reference herein, to wind in helical fashion a knitted tape, capable of undergoing only a prescribed limited amount of expansion, around the breaker plies to reinforce or supplement the latter with the necessary amount of circumferential stiffness. The knitted tape is provided with a plurality of side by side, substantially inextensible, rubbered encapsulated, cords that are crimped with sinusoidal undulations and releasably held as a unit adjacent to one another by, for example, a frangible cord knitted into and through the undulations.

One difficulty associated with the use of such a breaker-functioning knitted tape is its relatively high expense to fabricate. The inextensible cords are encapsulated in a sheath of rubber by an extrusion process that is excessively costly, and then knitted to one another, compounding the cost.

Another difficulty associated with the use of any breaker-functioning tape is the manner by which it is only helically wound, near zero degrees, around the underlying carcass construction. A tire completed in such a manner sometimes displays uneven tread wear in much the same way that would be displayed by the tread of a tire on a vehicle requiring an adjustment in alignment. It is theorized that the helical tape turns act something akin to screw threads forcing the tire components to shift or twist slightly relative to one another as the tire turns. This causes certain portions of the tread at the "footprint" or tread/road interface to shimmy or pivotally skid about an imaginary vertical axis normal to the footprint, thereby effecting concentrated high local stress and tread abrasion.

SUMMARY OF THE INVENTION

Accordingly, it is a principal object of the present invention to provide a new and improved breaker reinforcing tape for constructing single stage, radial ply tires that does not have associated therewith the aforementioned disadvantages.

More particularly, it is an object of the present invention to provide a breaker reinforcing tape that is simplified and less costly than such tapes heretofore known.

It is a further object of the present invention to provide a new method by which a breaker reinforcing tape should preferably be wound around a breaker assembly so as to prevent uneven tread wear.

With the above and additional objects in view, the present invention with respect to the breaker reinforcing tape comprises a crimped strip having continuous sinusoidal undulations, a plurality of cords extending side by side in parallel relation longitudinally along the strip, each of the cords having respective undulations corresponding to and nesting in the undulations of the strip, means for anchoring the apexes of the undulations of each of the cords to corresponding ones of the apexes of the undulations of the strip, a flat strip having a width substantially corresponding to the width of the crimped strip, means for anchoring the flat strip to alternate ones of the apexes of the undulations of the crimped strip, and frangible means interposed between the flat and crimped strips for releasably reinforcing and stabilizing the integrity of the flat strip against inadvertent expansion that would prematurely reduce the amplitude and frequency (number of undulations per unit length) of the undulations of the crimped strip and cords.

With respect to the method of the present invention, a carcass is constructed from at least one body ply and at least one breaker ply wound in succession around a carcass building drum. Thereafter, the tape of the present invention is wound helically around the breaker ply between the opposite edges thereof at substantially zero degrees relative to a median equatorial plane of the plies, the tape windings initiating and terminating in a respective end turn that extends circularly and non-helically over a full 360° around the breaker ply and overlaps itself at least partially. The carcass construction is continued by winding a tread-and-sidewall slab around the tape and the breaker and body plies, the slab at least in the tread region thereof having perforations to enable air entrapped therebeneath in the tape to be evacuated after beads are applied and anchored and the entire assembly is inflated into a torus.

BRIEF DESCRIPTION OF THE DRAWINGS

The present invention will be more clearly understood from the following detailed description thereof when read in conjunction with the accompanying drawings, in which:

FIG. 1 is an enlarged, fragmentary, perspective view of the tape of the present invention;

FIG. 2 is a further enlarged, fragmentary, perspective view of the tape of the present invention from which there is absent, for purposes of illustration, the crimped strip;

FIG. 3 is a side elevational view of the tape structure illustrated in FIG. 1;

FIG. 4 is a cross-sectional view taken along the line 4—4 in FIG. 1;

FIG. 5 is a cross-sectional view taken along the line 5—5 in FIG. 1;

FIG. 6 is a fragmentary, cross-sectional view of the pneumatic tire carcass construction of the present invention on a carcass building drum;

FIG. 7 is a schematic, fragmentary view of the carcass of the present invention before application thereto of the tape; and FIG. 8 is a schematic view illustrating the full 360° initiating and terminating end turns of the tape of the present invention as it would be wound on a tire carcass pursuant to the method of the present invention.

DETAILED DESCRIPTION OF THE INVENTION

Referring now to the drawings, and more particularly to FIGS. 1 through 5, the present invention involves a tape denoted generally by the reference character 20. The tape 20 includes an uncured, elastomeric, crimped strip 22 and an uncured elastomeric, flat strip 24. The strips 22 and 24 may be constituted of natural and/or synthetic rubbers or rubber mixtures that can be stretched and compressed, and are compatible with building pneumatic tires. Preferably, such strips 22 and 24 are also tacky for adhering to various components used in the construction of pneumatic tires, and particularly radial ply tires.

Between the strips 22 and 24, there is interposed a plurality of crimped cords 26 extending side by side in parallel relation longitudinally along the strips. The cords 26 are substantially inextensible, and have respective, for example, sinusoidal, undulations that with regard to the cord with which they correspond are substantially coplanar, and with regard to adjacent cords are laterally aligned or "in phase" with one another. The cords may be of the type of material known as Kevlar or Kevlar Aramid and sold by the Dupont Company. As best illustrated in FIG. 3, alternate ones of the apexes 28 of the undulations of each of the cords 26 are secured to the crimped strip 22, whereas the other alternate ones of the apexes 30 are secured to and tightly between the crimped strip 22 and the flat strip 24.

In this regard, the strips 22 and 24 are each compressible and tacky. As such, the cords 26 can be impressed into the surfaces of the strips 22 and 24 by any convenient means, and will remain so affixed thereto. Particularly, it is the apexes 28 and 30 of the undulations of each of the cords 26 that are first impressed into the strip 22. Thereafter, the flat strip 24 is pressed against the assembly of the crimped strip 22 and cords 26 only at the apexes 30 of the cords 26 and the corresponding regions of the strip 22. It is, thus, the flat strip 24 that sustains the crimped strip 22 and cords 26 in an undulation-presenting condition. It is the tacky condition of the strips 22 and 24 and their ready compressibility and impressibility that secures the assembly as a unit.

In order to assure the integrity of the flat strip 24 against inadvertent expansion that would prematurely reduce the amplitude and frequency (number of undulations per unit length of the strip 22) of the undulations of the crimped strip 22, and particularly assure that the tape 20 is provided with a reliable length that under prescribed tensile pressure is substantially invariable, frangible means in the form, for example, of one or more thin cotton elements 32 are fixedly predisposed in parallel relation flat along the flat strip 24 as the strip 24 is applied to the assembly of the crimped strip 22 and cords 26. The cotton elements 32 have a cross-sectional size that is less than the cross-sectional size of each of the cords 26 and may, for example, tear only after being subjected to tensile load in excess of five pounds. Needless to say, the tensile strength of the elements 32 must be greater than the stretch-resistance of the strip 24.

With respect to the cords 26, it is preferred that they be provided with weakened regions such as nicks or the like to enable the cords to rupture selectively at prescribed tensile loads. It is also preferred that such nicks or weakened regions in the cords 26 be staggered relative to one another from cord to cord so that should more than one of the cords rupture, they will not do so along the same lateral line of the tape 20. The depth of the nicks, for example, is selected to reduce the full tensile strength of each of the cords 26 to between about five percent and twenty percent of its original tensile strength.

Pursuant to the illustrated embodiment of the tape 20, it is comprised of nine cords 26 and has a width of, for example, five-eighths inch. It will be understood, however, that other numbers of such cords 26 may be selected, as well as other tape widths, depending on the particular purpose the tape 20 is to serve, and the particular pneumatic tire components and sizes it is to be constructively arranged with.

It is contemplated, pursuant to the present invention, that the tape 20 be utilized as an outer breaker for belted, radial ply tires capable of being constructed in a single stage. In this regard, it is contemplated that the tape 20 may be helically wound around a raw or uncured tire carcass such as that illustrated in FIG. 6 and denoted generally by the reference character 40. The carcass 40 is comprised of a pair of body plies 42 and 42a each reinforced with, for example, polyester cords 43 (FIG. 7), and a pair of breaker plies or belts 44 and 44a each reinforced with, for example, glass cords 45 (FIG. 7). The body plies 42, 42a are arranged cylindrically on a carcass building drum 46 such that the parallel polyester cords 43 thereof run parallel to the axis of the drum or at 90° relative to a median equatorial plane of the carcass. The breaker plies 44, 44a, on the other hand, are arranged cylindrically around the body plies 42, 42a such that their respective glass cords 45 from belt to belt run oppositely of one another, and within each belt run parallel to one another at an angle relative to the median equatorial plane of the carcass in excess of 35° and preferably approximately 45°.

The cylindrical carcass 40 of the body plies 42, 42a and breaker plies 44, 44a is to be reinforced by the tape 20 by winding the latter helically around the outer breaker ply 44 from one edge thereof to the other. However, pursuant to a principal concept of the present invention, the tape 20 is wound around the breaker ply 44 in a preferred manner. In this regard, as best illustrated in FIG. 8, the very first turn 50 of the tape 20 is wound around the outer breaker ply 44 near or adjacent to one edge thereof entirely at 0°, or, more particularly, circularly and non-helically such that it extends a full 360° and then overlaps itself at least in part without straying from its 0° pitch. Once such a partial overlap is achieved, the pitch of the tape turn locus can be altered from zero degrees into a helical path near, but slightly in excess of, 0° until the entire breaker ply 44 is helically covered. The last turn, however, is terminated in the same manner as the first turn is initiated. As such, the last turn 52 is effected entirely at zero degrees, circularly and non-helically, such that it extends a full 360° and then overlaps itself at least in part at the opposite edge of the breaker ply 44.

After the tape 20 is applied to the carcass 40, a pair of beads is applied and anchored to the opposite end portions of the assembly, a tread-and-sidewall slab 54, perforated at least between the opposite edges of the breaker ply 44, for example, at 55, is wound upon the assembly, and the cylindrical assembly is transformed into the shape of a torus in the curing press. As the assembly is so transformed, the glass cords 45 of the breaker plies 44, 44a pantograph slightly to accommodate the circumferential expansion of such plies, and the tape 20 is stretched taut. As the tape 20 is so stretched, the undulations of its cords 26 and of the strip 22 are completely flattened, and the frangible cotton elements are torn. Moreover, air entrapped in the crimped undulations of the tape 20 beneath the tread-and-sidewall slab 54 is forcibly discharged through the venting perforations 55 of the slab 54 during such circumferential expansion of the carcass components.

It will be understood that the amplitude and frequency of the undulations of the tape 20 is selected as a function of the elongation that the tape will undergo as the cords are transformed from their initial crimped condition on the cylindrical carcass 40 to their final straightened condition on the toroidal carcass. The amount of permitted "soft stretch" or substantially non-stressed elongation of the tape thus is the difference between the crimped cord length and the straight cord length. It is preferred, in this regard, that the inextensible cords 26 should not be physically stretched. However, since the cords are nicked periodically, should they become overstressed somewhat during the circumferential expansion of the carcass 40, such nicks will tear or stretch slightly to allow for final crown curvature or even for processing variations, or to prevent cords 26 from being pulled damagingly into abrasive engagement with the underlying glass cords 45 of the outer breaker ply 44.

The cylindrical belted, radial carcass 40, when ready for vulcanization into its final tire product condition, thus is a "single stage" intermediate article requiring no additional steps of construction. In the finished tire, the full 360° initiating and terminating end turns of the tape 20 prevent the intermediary helical turns thereof from causing twisting of the tire components relative to one another at the tread/road interface and thereby prevent excessive, uneven tread wear. Such end turns, therefore, stabilize the tire and prolong its useful life.

It will be understood that the foregoing description of preferred embodiments of the present invention is for purposes of illustrations only, and that the various structural and operational features and relationships herein disclosed are susceptible to a number of modifications and changes none of which entails any departure from the spirit and scope of the present invention as defined in the hereto appended claims. Merely by way of example, if it is desired to build a zero degree belted tire having no bias-angled breaker plies around the crown region of the carcass, the zero degree belt-forming structure can be attained by winding the tape, at the 0° winding angle and in the manner herein described, directly onto the body plies of the tire carcass.

What is claimed is:

1. A breaker reinforcing tape for pneumatic tires, said tape comprising a crimped strip having continuous undulations, a plurality of cords extending side by side in parallel relation longitudinally along said strip, each of said cords having respective undulations corresponding to and nesting in the undulations of said strip first means for anchoring the apexes of the undulations of each of said cords to corresponding ones of the apexes of the undulations of said crimped strip, a flat strip having a width substantially corresponding to the width of said crimped strip, second means for anchoring said flat strip to alternate ones of the apexes of the undulations of said crimped strip, and frangible means interposed between said flat and crimped strips for releasably reinforcing and stabilizing said flat strip against inadvertent expansion that would prematurely reduce the amplitude and frequency of the undulations of said crimped strip and of said cords.

2. A breaker reinforcing tape as claimed in claim 1, wherein said crimped and flat strips are elastomeric and tacky.

3. A breaker reinforcing tape as claimed in claim 2, wherein said first anchoring means is constituted by respective portions of said cords engaging and impressed into corresponding portions of said crimped strip.

4. A breaker reinforcing tape as claimed in claim 3, wherein said second anchoring means is constituted by respective portions of said flat and crimped strips mutually engaging and pressed into one another.

5. A breaker reinforcing tape as claimed in claim 1, wherein said cords are flexible but substantially inextensible.

6. A breaker reinforcing tape as claimed in claim 5, wherein said cords are constituted of aramid fiber.

7. A breaker reinforcing tape as claimed in claim 5, wherein said frangible means includes at least one flexible filament having a tensile strength that is greater than the stretch resistance of at least said flat strip.

8. A breaker reinforcing tape as claimed in claim 7, wherein said tensile strength of said flexible filament is such that the latter will tear when subjected to a load of approximately 5 pounds.

9. A breaker reinforcing tape as claimed in claim 7, wherein said flexible filament is fixedly predisposed between said flat and crimped strips in a substantially straight condition.

10. A breaker reinforcing tape as claimed in claim 7, wherein said flexible filament is constituted of cotton and has a cross-sectional size that is less than the cross-sectional size of each of said cords.

11. A breaker reinforcing tape as claimed in claim 5, wherein said cords are each provided with a nick, the nick of each said cord being staggered relative to the nick of an adjacent one of said cords.

12. A breaker reinforcing tape as claimed in claim 1, wherein said crimped and flat strips have a width each of approximately five-eighths inches.

13. A breaker reinforcing tape for pneumatic tires, said tape comprising a crimped strip having continuous undulations, a plurality of cords extending side by side in parallel relation longitudinally along said strip, each of said cords having respective undulations corresponding to and nesting in the undulations of said strip, first means for anchoring each of said cords to said crimped strip, a flat strip having a width substantially corresponding to the width of said crimped strip, second means for anchoring said flat strip to alternate ones of the apexes of the undulations of said crimped strip, and frangible means coextensive with said flat strip for releasably reinforcing and stabilizing said flat strip against inadvertent expansion that would prematurely reduce the amplitude and frequency of the undulations of said crimped strip and of said cords.

14. A breaker reinforcing tape as claimed in claim 13, wherein said first anchoring means is constituted by respective portions of said cords at the apexes of the undulations thereof engaging and impressed into corresponding juxtaposed portions of said crimped strip at the apexes of its undulations.

15. A breaker reinforcing tape as claimed in claim 13, wherein said second anchoring means is constituted by the respective alternate ones of said apexes of the undulations of said crimped strip and the juxtaposed portions of said flat strip mutually engaging and pressed into one another.

16. A breaker reinforcing tape as claimed in claim 13, wherein said frangible means is interposed between said flat and crimped strips and includes at least one flexible filament having a tensile strength that is greater than the stretch resistance of at least said flat strip.

17. A method of fabricating a breaker-forming tape for pneumatic tires, said method comprising crimping an elastomeric strip to present continuous undulations, securing in a crimped condition a plurality of parallel, substantially inextensible, flexible cords to said strip such that the undulations of said cords correspond to and nest in the undulations of said strip, securing a flat elastomeric strip to said crimped strip such that alternate ones of the apexes of the undulations of said crimped strip are engaged with and secured to said flat strip, and predisposing in a fixed and substantially straight condition between said crimped strip and said flat strip at least one frangible, flexible element for releasably reinforcing and stabilizing said flat strip against inadvertent expansion that would prematurely reduce the amplitude and frequency of the undulations of said crimped strip and said cords.

18. A method of fabricating a breaker-forming tape for pneumatic tires, said method comprising crimping an elastomeric strip to present continuous undulations, securing in a crimped condition a plurality of parallel, substantially inextensible, flexible cords to said strip such that the undulations of said cords correspond to and nest in the undulations of said strip, securing a flat elastomeric strip to said crimped strip such that alternate ones of the apexes of the undulations of said crimped strip are engaged with and secured to said flat strip, and predisposing in a substantially straight condition and coextensive with said flat strip at least one frangible, flexible element for releasably reinforcing and stabilizing said flat strip against inadvertent expansion that would prematurely reduce the amplitude and frequency of the undulations of said crimped strip and said cords.

19. A method as claimed in claim 18, wherein said frangible means is interposed between said flat and crimped strips and includes at least one flexible filament having a tensile strength that is greater than the stretch resistance of at least said flat strip.

20. A method as claimed in claim 18, wherein the securing of said cords to said crimped strip is effected by engaging and impressing said cords at the respective apexes of the undulations thereof into corresponding portions of the apexes of the undulations of said crimped strip.

21. An uncured belted pneumatic tire, comprising a carcass composed of at least one body ply, and a belt-forming structure surrounding said body ply in the medial region of said carcass, said belt-forming structure being constituted by a tape of cords wound substantially helically around said medial region of said carcass with a multiplicity of turns having a pitch of substantially zero degrees relative to the median equatorial or mid-circumferential plane of said carcass, and said tape comprising a crimped strip having continuous undulations, a plurality of said cords extending side by side in parallel relation longitudinally along said crimped strip, each of said cords having respective undulations corresponding to and nesting in the undulations of said crimped strip, first means for anchoring each of said cords to said crimped strip, a flat strip having a width substantially corresponding to the width of said crimped strip, second means for anchoring said flat strip to alternate ones of the apexes of the undulations of said crimped strip, and frangible means coextensive with said flat strip for releasably reinforcing and stabilizing said flat strip against inadvertent expansion that would prematurely reduce the amplitude and frequency of the undulations of said crimped strip and of said cords.

22. An uncured tire as claimed in claim 21, wherein said first anchoring means is constituted by respective portions of said cords at the apexes of the undulations thereof engaging and impressed into corresponding juxtaposed portions of said crimped strip at the apexes of its undulations.

23. An uncured tire as claimed in claim 21, wherein said second anchoring means is constituted by the respective alternate ones of said apexes of the undulations of said crimped strip and the juxtaposed portions of said flat strip mutually engaging and pressed into one another.

24. An uncured tire as claimed in claim 21, wherein said frangible means includes at least one flexible filament having a tensile strength that is greater than the stretch resistance of at least said flat strip.

25. An uncured tire as claimed in claim 24, wherein said tensile strength of said flexible filament is such that the latter will tear when subjected to a load of approximately five pounds.

26. An uncured tire as claimed in claim 24, wherein said flexible filament is fixedly predisposed between said flat and crimped strips in a substantially straight condition.

27. An uncured tire as claimed in claim 24, wherein said flexible filament is constituted of cotton and has a cross-sectional size that is less than the cross-sectional size of each of said cords.

28. An uncured tire as claimed in claim 21, wherein said cords are flexible but substantially inextensible.

29. An uncured tire as claimed in claim 28, wherein said cords are constituted of aramid fiber.

30. An uncured tire as claimed in claim 28, wherein said cords are each provided with at least one nick, and said nicks in adjacent ones of said cords are staggered relative to one another.

31. An uncured tire as claimed in claim 21, wherein said crimped and flat strips of said tape have a width each of approximately five-eighths inch.

32. An uncured tire as claimed in claim 21, wherein said crimped and flat strips are elastomeric and tacky.

33. An uncured belted pneumatic tire, comprising a carcass composed of at least one substantially cylindrical body ply, at least one breaker ply surrounding and secured to said body ply in the medial region of said carcass, and a breaker reinforcement-forming cord structure surrounding said breaker ply, said structure being in the form of a tape wound substantially helically around said breaker ply at an angle of substantially zero degrees to the mid-circumferential plane of said carcass, and said tape comprising a crimped strip having continuous undulations, a plurality of cords extending side by side in parallel relation longitudinally along said crimped strip, each of said cords having respective undulations corresponding to and nesting in the undulations of said crimped strip, first means for anchoring each of said cords to said crimped strip, a flat strip having a width substantially corresponding to the width of said crimped strip, second means for anchoring said flat strip to alternate ones of the apexes of the undulations of said crimped strip, and frangible means coextensive with said flat strip for releasably reinforcing and stabilizing said flat strip against inadvertent expansion that would prematurely reduce the amplitude and frequency of the undulations of said crimped strip and of said cords.

34. An uncured tire as claimed in claim 33, wherein said tape is wound with said end turns thereof disposed intermediate the opposite edges of said breaker ply.

35. An uncured tire as claimed in claim 33, wherein said first anchoring means is constituted by respective portions of said cords engaging and impressed into corresponding portions of said crimped strip.

36. An uncured tire as claimed in claim 33, wherein said first anchoring means is constituted by respective portions of said cords at the apexes of the undulations thereof engaging and impressed into corresponding juxtaposed portions of said crimped strip at the apexes of its undulations.

37. An uncured tire as claimed in claim 33, wherein said second anchoring means is constituted by the respective alternate ones of said apexes of the undulations of said crimped strip and the juxtaposed portions of said flat strip mutually engaging and pressed into one another.

38. An uncured tire as claimed inclaim 33, wherein said frangible means includes at least one flexible filament having a tensile strength that is greater than the stretch resistance of at least said flat strip.

39. An uncured tire as claimed in claim 38, wherein said tensile strength of said flexible filament is such that the latter will tear when subjected to a load of approximately five pounds.

40. An uncured tire as claimed in claim 38, wherein said flexible filament is fixedly predisposed between said flat and crimped strips in a substantially straight condition.

41. An uncured tire as claimed in claim 38, wherein said flexible filament is constituted of cotton and has a cross-sectional size that is less than the cross-sectional size of each of said cords.

42. An uncured tire as claimed in claim 33, wherein said cords are flexible but substantially inextensible.

43. An uncured tire as claimed in claim 42, wherein said cords are constituted of aramid fiber.

44. An uncured tire as claimed in claim 33, wherein said cords are each provided with at least one nick, and said nicks in adjacent ones of said cords are staggered relative to one another.

45. An uncured tire as claimed in claim 33, wherein said carcass comprises a second said body ply and a second breaker ply, each of said body and breaker plies having encapsulated therein a respective plurality of spaced, parallel reinforcing cords, the reinforcing cords of said body plies extending at substantially 90° relative to said mid-circumferential plane of said carcass, the reinforcing cords of said breaker plies being oppositely oriented from ply to ply relative to said mid-circumferential plane and forming an angle relative thereto which in each breaker ply is in excess of approximately 35°.

46. An uncured tire as claimed in claim 33, wherein the reinforcing cords of said body ply are constituted of polyester, and the reinforcing cords of said breaker ply are constituted of glass.

47. An uncured tire as claimed in claim 33, further comprising a tread slab affixed to said carcass in surrounding relation to said structure, said tread slab having perforations at least between the respective opposite end turns of said tape.

48. An uncured tire as claimed in claim 33, wherein said crimped and flat strips of said tape have a width each of approximately five-eighths inch.

49. An uncured tire as claimed in claim 33, wherein said crimped and flat strips are elastomeric and tacky.

50. A method of constructing a raw belted pneumatic tire, comprising the steps of wrapping at least one body ply around a tire building drum, and winding a multiplicity of turns of a breaker-forming tape helically around a medial portion of said body ply between the opposite edges thereof at substantially zero degrees relative to the mid-circumferential plane of said body ply, and said tape comprising a crimped strip having continuous undulations, a plurality of cords extending side by side in parallel relation longitudinally along said crimped strip, each of said cords having respective undulations corresponding to and nesting in the undulations of said crimped strip, first means for anchoring each of said cords to said crimped strip, a flat strip having a width substantially corresponding to the width of said crimped strip, second means for anchoring said flat strip to alternate ones of the apexes of the undulations of said crimped strip, and frangible means coextensive with said flat strip for releasably reinforcing and stabilizing said flat strip against inadvertent expansion that would prematurely reduce the amplitude and frequency of the undulations of said crimped strip and of said cords.

51. A method as claimed in claim 50, wherein said first anchoring means is constituted by respective portions of said cords at the apexes of the undulations thereof engaging and impressed into corresponding juxtaposed portions of said crimped strip at the apexes of its undulations.

52. A method as claimed in claim 50, wherein said second anchoring means is constituted by the respective alternate ones of said apexes of the undulations of said crimped strip and the juxtaposed portions of said flat strip mutually engaging and pressed into one another.

53. A method as claimed in claim 50, wherein said frangible means is interposed between said flat and crimped strips and includes at least one flexible filament having a tensile strength that is greater than the stretch resistance of at least said flat strip.

54. A method as claimed in claim 50, and comprising the further step, to precede the winding of said tape around said body ply, of wrapping at least one breaker ply of reduced axial extent around said body ply, said tape winding step being performed to dispose said tape directly around said breaker ply.

55. A method as claimed in claim 54, said tape winding step being performed to dispose the opposite end turns of said tape intermediate the opposite edges of said breaker ply.

* * * * *